(12) United States Patent
Wang et al.

(10) Patent No.: US 9,522,782 B2
(45) Date of Patent: Dec. 20, 2016

(54) AUTOMATIC RUBBING ROLLER STORAGE SYSTEM AND PICK-AND-PLACE METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Wenhao Wang, Beijing (CN); Zhubing Huang, Beijing (CN); Yanping Hong, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 14/894,156

(22) PCT Filed: Jun. 3, 2015

(86) PCT No.: PCT/CN2015/080669
§ 371 (c)(1),
(2) Date: Nov. 25, 2015

(87) PCT Pub. No.: WO2016/090866
PCT Pub. Date: Jun. 16, 2016

(65) Prior Publication Data
US 2016/0229632 A1 Aug. 11, 2016

(51) Int. Cl.
*G06F 7/00* (2006.01)
*B65G 1/137* (2006.01)
*G05B 15/02* (2006.01)

(52) U.S. Cl.
CPC ............... *B65G 1/137* (2013.01); *G05B 15/02* (2013.01)

(58) Field of Classification Search
CPC ....................................................... B65G 1/137
(Continued)

(56) References Cited

U.S. PATENT DOCUMENTS

| 3,546,774 A | 12/1970 | Stofferle et al. |
| 5,304,110 A | 4/1994 | Obrist |

(Continued)

FOREIGN PATENT DOCUMENTS

| CN | 202864397 U | 4/2013 |
| CN | 104495268 A | 4/2015 |
| EP | 0132599 A1 | 2/1985 |

OTHER PUBLICATIONS

International Search Report & Written Opinion Appln. No. PCT/CN2015/080669; Dated Sep. 16, 2015.

*Primary Examiner* — Kyle Logan
(74) *Attorney, Agent, or Firm* — Ladas & Parry LLP

(57) ABSTRACT

An automatic rubbing roller storage system includes a roller storing device, a roller transport track, a roller transport platform and a positioning device; the roller storing device includes a rotatable roller storing portion, the roller storing portion has one end provided with a first damper and the other end provided with a second damper, and the roller is held therebetween; the roller transport platform includes a sliding base and a roller placement platform; a transmission device is disposed between the roller transport track and the sliding base. The automatic rubbing roller storage system can achieve automatic roller pick-and-place operation, improve the efficiency, save a large number of human labors and reduce the production and maintenance cost. An automatic rubbing roller pick-and-place method is also provided.

18 Claims, 8 Drawing Sheets

(58) Field of Classification Search
USPC .......................................................... 700/217
See application file for complete search history.

(56) References Cited

U.S. PATENT DOCUMENTS

| | | | |
|---|---|---|---|
| 6,237,176 B1 * | 5/2001 | Egoshi | B08B 7/0028 15/102 |
| 2015/0065015 A1 * | 3/2015 | Sun | G02F 1/133784 451/54 |

* cited by examiner

AUTOMATIC RUBBING ROLLER STORAGE SYSTEM AND PICK-AND-PLACE METHOD

TECHNICAL FIELD

Embodiments of the present invention relate to an automatic rubbing roller storage system and a pick-and-place method.

BACKGROUND

During a cell-assembling process of liquid crystal panels, a rubbing step is performed by rubbing an alignment film surface of a substrate in a certain direction with a certain force using a roller wrapped with nylon cloth or cotton cloth so as to form channels which allow liquid crystals to have directional alignment and pre-tilt angle. Such step is also referred to as alignment technology of liquid crystal molecules. The effect of alignment directly affects qualities of liquid crystal devices, thus the alignment technology has extremely strict requirements on the roller; wherein, apart from a material of the roller that may affect qualities of the roller such as precision and deformation resistance, a storing means of the roller may also have considerable influence thereto. Furthermore, manufactures recently have increasingly higher requirements on cost and efficiency for storing rollers.

A currently known roller-storage system merely can achieve semi-automatic roller pick-and-place operation. The system includes a roller storage and a robot configured for roller pick-and-place with a structure illustrated in FIG. 1 and FIG. 2, respectively. The robot is a multi-joint apparatus freely movable as a whole, including a plurality of freely rotatable joints, stretching arms 12 disposed between the joints, and a clamping arm 14 configured to clamp the roller; the roller storage includes a clamping clip 16 and a clamping slot 15 which are configured to clamp the roller, and a storing platform; as illustrated in FIG. 3, a roller transporter used as the device transporting the roller includes wheels 17 and a roller transport platform 18 on which the roller can be placed. With such semi-automatic roller storage system, the roller transporter is fixed at a certain position in the storage by manual works so as to precisely position the robot to pick up a roller from the roller transporter, then the clamping arm of the robot clamps the roller tightly and transports the same into the clamper 16 and the slot 15 at a corresponding position on the storing platform; when it is determined that the roller 1 has been placed in position, the robot returns to an original pre-set position and waits for a pick-and-place instruction for another roller 1.

As above, the currently known semi-automatic roller storage system mainly relies on a precise positioning of the robot to achieve roller pick-and-place operation, which is a complicated and slow process and may heavily influence the pick-and-place efficiency; moreover, when stored for a long period of time, the roller is likely to have bending deformation because it is placed at an inclined angle, which may influence qualities, performances and a service life of the roller.

SUMMARY

At least one embodiment of the present invention provides an automatic rubbing roller storage system and a rubbing roller pick-and-place method to solve technical problem that currently known roller pick-and-place operation is complicated and slow with poor efficiency.

The automatic rubbing roller storage system as provided by embodiments of the present invention includes a roller storing device, a roller transport track, a roller transport platform and a positioning device.

The roller storing device includes a rotatable roller storing portion, the roller storing portion has one end connected to a first holder and the other end connected to a second holder; the first holder and the second holder are fixedly mounted at two sides of the roller transport track; the first holder is provided with a first motor configured to drive the roller storing portion to rotate; one end of the roller storing portion is provided with at least two first clampers uniformly distributed along a circumferential direction, and the other end of the roller storing portion is provided with second clampers corresponding to the first dampers; the first clamper and the corresponding second clamper are cooperated with each other to hold a roller therebetween.

The roller transport platform is disposed on the roller transport track, and includes a sliding base slidably engaged with the roller transport track and a roller placement platform for placing the roller; a transmission device and a guiding pair are disposed between the roller transport track and the sliding base so as to drive the sliding base to move in linear motion along the roller transport track; the sliding base is provided with a first lifting device configured to drive the roller placement platform to move upwards and downwards; and the roller placement platform is provided with a roller placement slot.

The positioning device includes a sensor configured to sense the roller transport platform, the sensor is fixed on at least one of the first holder and the second holder and is electrically connected to a control unit; wherein a movement condition of each of the first motor, the transmission device and the first lifting device is controlled by the control unit, and a clamping action of at least one of the first clamper and the second clamper is controlled by the control unit.

In an example, the roller storing portion includes a first clamping plate and a second clamping plate which are fixedly connected together through a coupling shaft; an inner side of the first clamping plate is provided with the at least two first clampers uniformly distributed along a circumference direction, and an inner side of the second clamping plate is provided with the second clampers corresponding to the first dampers; an output shaft of the first motor is fixedly connected to the first clamping plate, and an outer casing of the first motor is connected to the first holder.

In an example, the first holder is provided with a first sliding chute along a vertical direction; the outer casing of the first motor is provided with at least one pair of guiding surfaces parallel to each other, the guiding surfaces are slidably engaged with the first sliding chute; an inner side of the second holder is provided with a sliding track along a vertical direction; an outer side of the second clamping plate is provided with a second sliding chute slidably engaged with the sliding track; the second holder is provided with a second lifting device configured to drive the second clamping plate to move upwards and downwards, and a raising and descending action of the second lifting device is controlled by the control unit.

Alternatively, the first holder is provided with a first sliding chute along a vertical direction; an outer side of the first clamping plate is provided with a first sliding block slidably engaged with the first sliding chute; the outer casing of the first motor is fixedly connected to the first sliding block; an inner side of the second holder is provided with a sliding track along a vertical direction, an outer side of the second clamping plate is provided with a second sliding chute slidably engaged with the sliding track; the second holder is provided with a second lifting device configured to drive the second clamping plate to move upwards and downwards, and a raising and descending action of the second lifting device is controlled by the control unit.

In an example, the second lifting device includes a second motor, a screw rod fixedly connected to an output shaft of the second motor, and a nut engaged with the screw rod; the nut is fixedly connected to the second clamping plate; an outer casing of the second motor is fixedly mounted on the second holder; and the second motor is electrically connected to the control unit.

In an example, the outer side of the second clamping plate is provided with a second sliding block, the second sliding chute is provided at an outer side of the second sliding block; and the nut is fixedly connected to the second sliding block.

In an example, the sliding track is a linear guiding track.

In an example, the first clamping plate and the second clamping plate both have a disc-like structure in a shape of regular polygon; the first clamper is fixedly connected at a corner position of the first clamping plate, and correspondingly the second damper is fixedly connected at a corner position of the second clamping plate.

In an example, the first clamping plate and the second clamping plate both have a disc-like structure in a shape of square, regular hexagon, regular octagon, regular decagon or regular dodecagon.

In an example, the first damper is a pneumatic claw, the second clamper is a claw groove, and a clamping action of the pneumatic claw is controlled by the control unit.

In an example, the transmission device includes a rack disposed along a length direction of the roller transport track, a gear engaged with the rack, and a roller transport motor configured to drive the gear to rotate; an outer casing of the roller transport motor is fixedly connected at the sliding base, an output shaft of the roller transport motor is fixedly connected to the gear, and the roller transport motor is electrically connected to the control un it.

In an example, the first lifting device is a cylinder, a base of the cylinder is fixedly connected to the sliding base, a piston rod of the cylinder is fixedly connected to the roller placement platform, and an up-and-down action for stretching out and drawing back of the piston rod of the cylinder is controlled by the control unit.

In an example, the roller transport track is provided with a guiding track along a length direction thereof, the sliding base is provided with a guiding groove slidably engaged with the guiding track, and a slidable engagement between the guiding track and the guiding groove forms the guiding pair.

In an example, the roller placement slot is arranged in two rows in parallel.

Embodiments of the present invention further provides an automatic rubbing roller pick-and-place method by using the above-described automatic rubbing roller storage system, including a roller-picking step, a roller-transporting step and a roller-storing step which are performed in sequence.

The roller-picking step includes: the control unit controls the transmission device between the roller transport platform and the roller transport track to drive the roller transport platform to move along the roller transport track until reaching a roller-picking ready position of a rubbing machinery carried with a roller to be picked; then the control unit controls the first lifting device to drive the roller placement platform to move upwards until reaching a receiving position at a certain height; then an automatic roller-loading device of the rubbing machinery automatically loads the roller to be picked into the roller placement slot on the roller placement platform; then the control unit controls the first lifting device to drive the roller placement platform to move downwards to return to an original position.

The roller-transporting step includes: the control unit controls the transmission device to drive the roller transport platform carried with the roller to move until reaching a roller-storing ready position of the roller storing device, then controls the positioning device to precisely position the roller transport platform.

The roller-storing step includes: the control unit controls the first motor to drive the roller storing portion to rotate by a certain angle, so as to allow a corresponding storing position on the roller storing portion being right above the roller on the roller transport platform which has been precisely positioned; then the control unit controls the first lifting device to drive the roller placement platform upwards until reaching a clamping position, and/or, controls the second motor to drive the roller storing portion to move downwards until reaching the clamping position; then the control unit controls the first clamper and the second clamper to hold the roller therebetween; then the control unit controls the first lifting device to drive the roller placement platform to move downwards to return to its original position, and/or, controls the second motor to drive the roller storing portion to move upwards to return to its original position.

BRIEF DESCRIPTION OF THE DRAWINGS

Embodiments of the present invention will be described in more detail below with reference to the accompanying drawings to enable those skilled in the art to understand the present invention more clearly, wherein.

Figure 1:
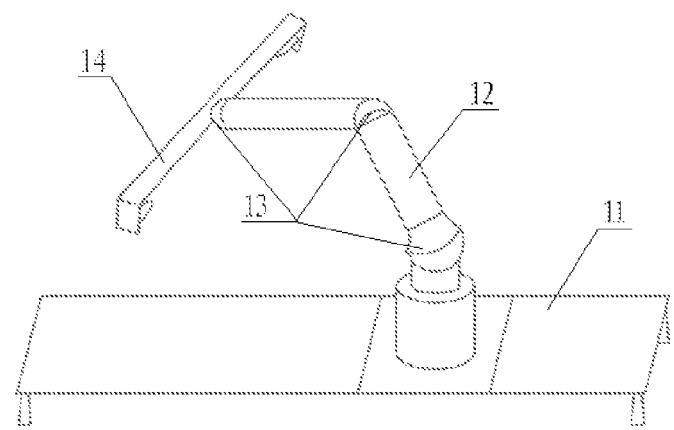
FIG. 1 is a schematic diagram illustrating a structure of a known robot.
Figure 2:
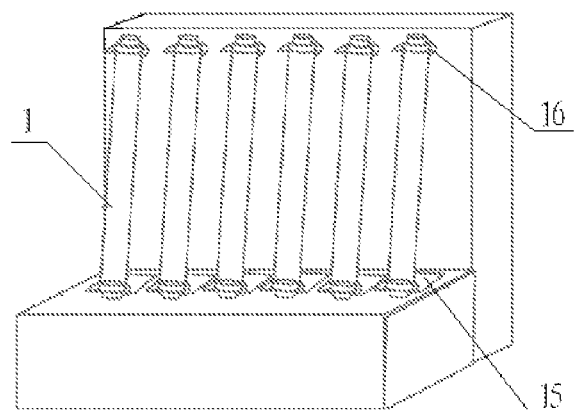
FIG. 2 is a schematic diagram illustrating a structure of a known roller storage.
Figure 3:
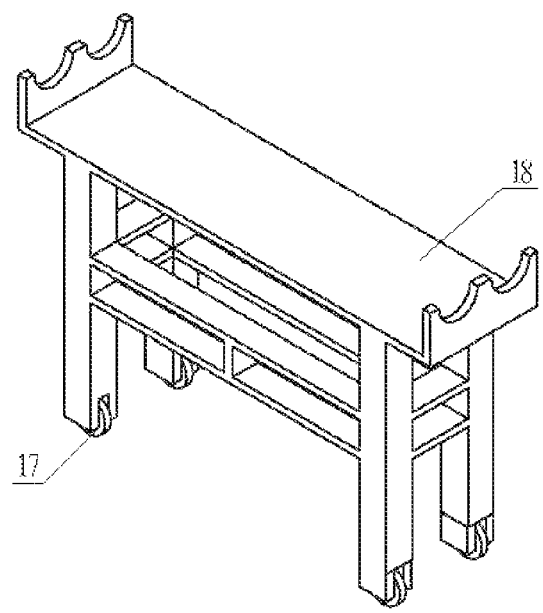
FIG. 3 is a schematic diagram illustrating a structure of a known roller transporter.
Figure 4:
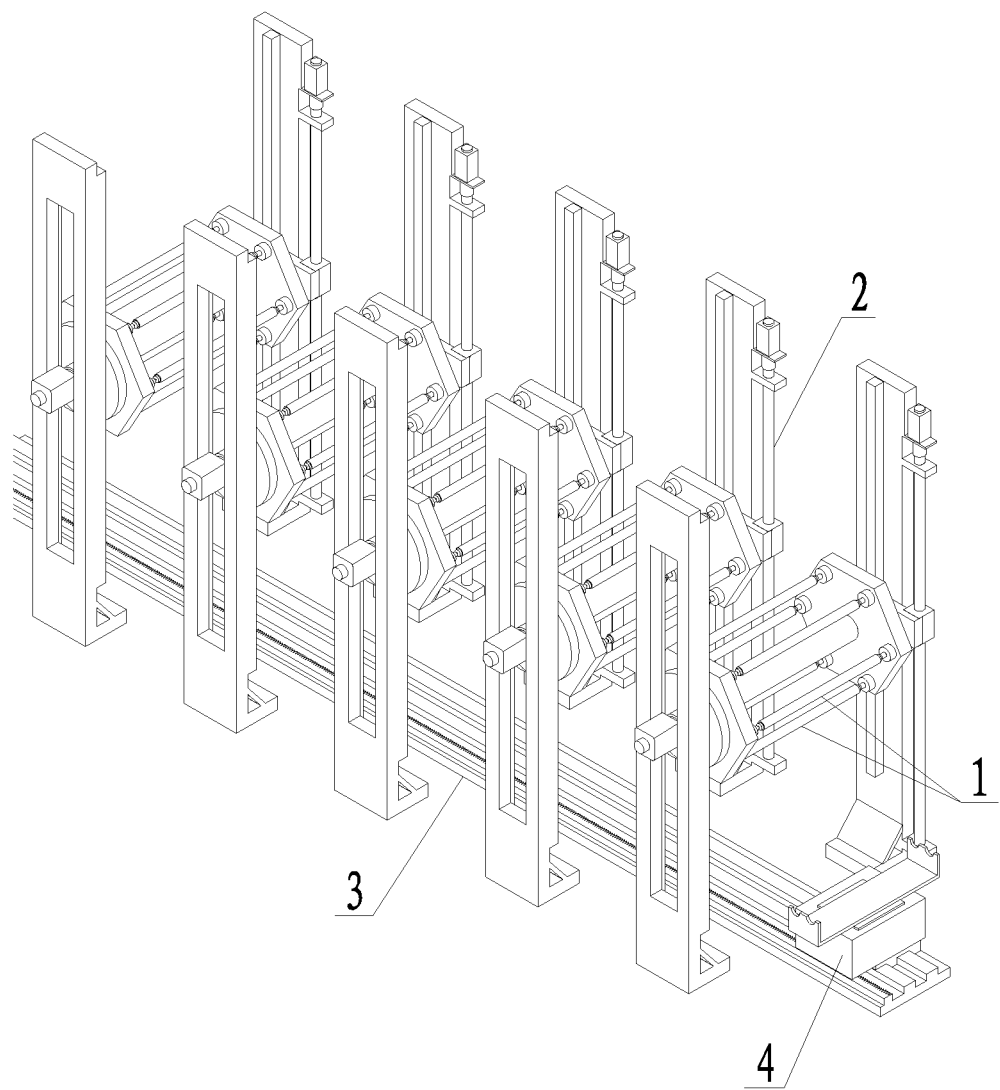
FIG. 4 is a schematic diagram illustrating a spatial structure of an automatic rubbing roller storage system according to an embodiment of the present invention.

Reference Numerals: 1—roller; 2—roller storing device; 3—roller transport track; 4—roller transport platform; 5—positioning device; 6—rubbing machinery; 7—automatic roller-loading device; 8—control unit; 11—sliding shaft; 12—stretching arm; 13—joint; 14—clamping arm;

15—clamping slot; 16—clamping clip; 17—wheel; 18—roller transporter; 20—roller storing portion; 201—first holder; 202—first motor; 203—first clamping plate; 204—second clamping plate; 205—second holder; 206—sliding track; 207—second motor; 208—screw rod; 209—nut; 210—second sliding block; 211—second damper; 212—coupling shaft; 213—first damper; 214—first sliding chute; 301—rack; 302—guiding track; 401—sliding base; 402—roller placement platform; 403—roller placement slot; 404—guiding groove; 405—gear; 406—roller transport motor; 407—cylinder; 501—sensor.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one The terms, such as "include/including," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Embodiments of the present invention relate to an automatic rubbing roller storage system, mainly including a roller storing device 2, a roller transport track 3, a roller transport platform 4 movable on the roller transport track 3, a positioning device 5 disposed on the roller storing device 2, and a control unit 8 electrically connected to the roller storing device 2, the roller transport platform 4 and the positioning device 5.

Embodiments of the present invention further provide an automatic rubbing roller pick-and-place method by using the above-mentioned automatic rubbing roller storage system, mainly including a roller-picking step, a roller-transporting step and a roller-storing step which are performed in sequence.

In an embodiment of the present invention, the control unit 8 controls the roller transport platform 4 to move in free motion on the roller transport track 3; when approaching a target location, the roller transport platform 4 is precisely positioned right below the roller storing device 2 by the positioning device 5 cooperated with the control unit 8; then the control unit 8 sends an instruction to load a roller 1 carried on the roller transport platform 4 and place the roller 1 onto a corresponding position on the roller storing device 2.

It should be noted that, as used herein, the term "inner side" refers to a side facing the roller transport track 3 and the term "outer side" refers to a side facing away the roller transport track 3. Furthermore, in embodiments of the present invention, the roller 1 is initially disposed at a rubbing machinery 6 and ready for being transported by the roller transport platform 4 and then placed onto the corresponding location of the roller storing device 2, but the present invention is not limited thereto.

First Embodiment

The first embodiment of the present invention provides an automatic rubbing roller storage system, including a roller storing device 2, a roller transport track 3, a roller transport platform 4 and a positioning device 5, as illustrated in FIG. 4-FIG. 11.

Figure 6:
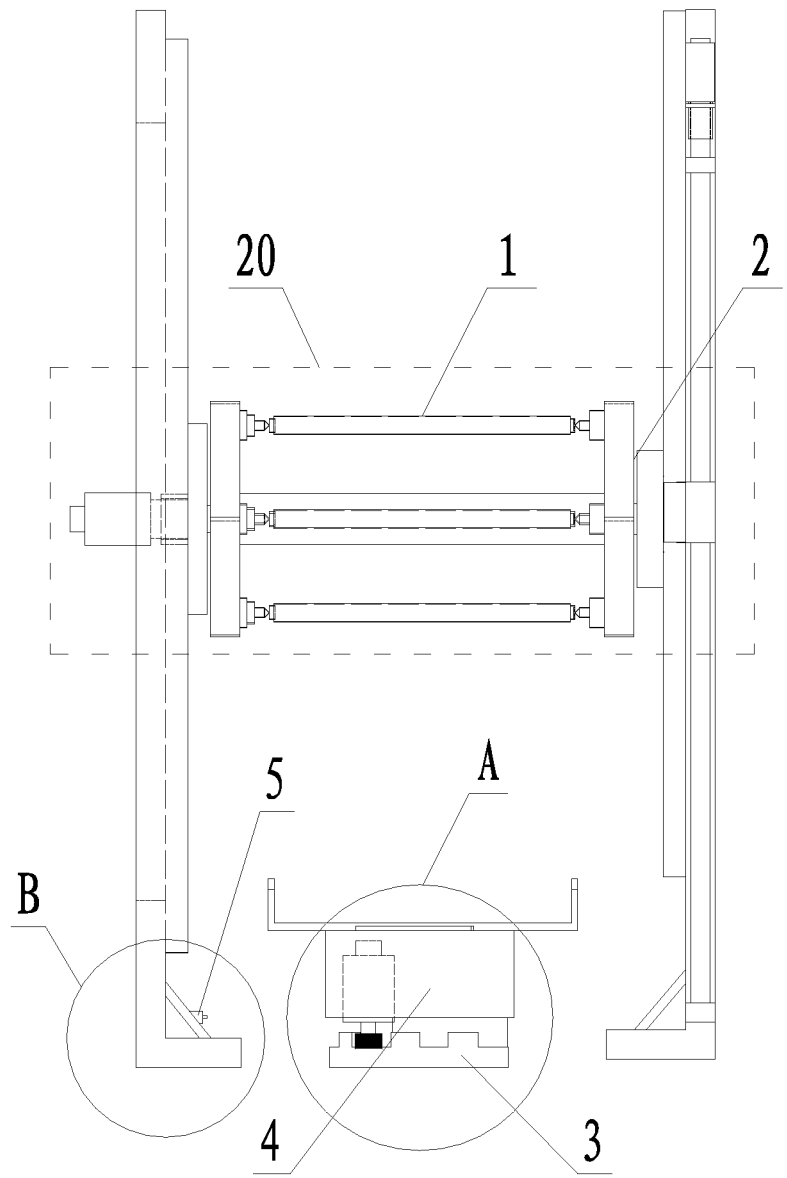
FIG. 6 is a right side view of the automatic rubbing roller storage system as illustrated in FIG. 5.
Figure 7:
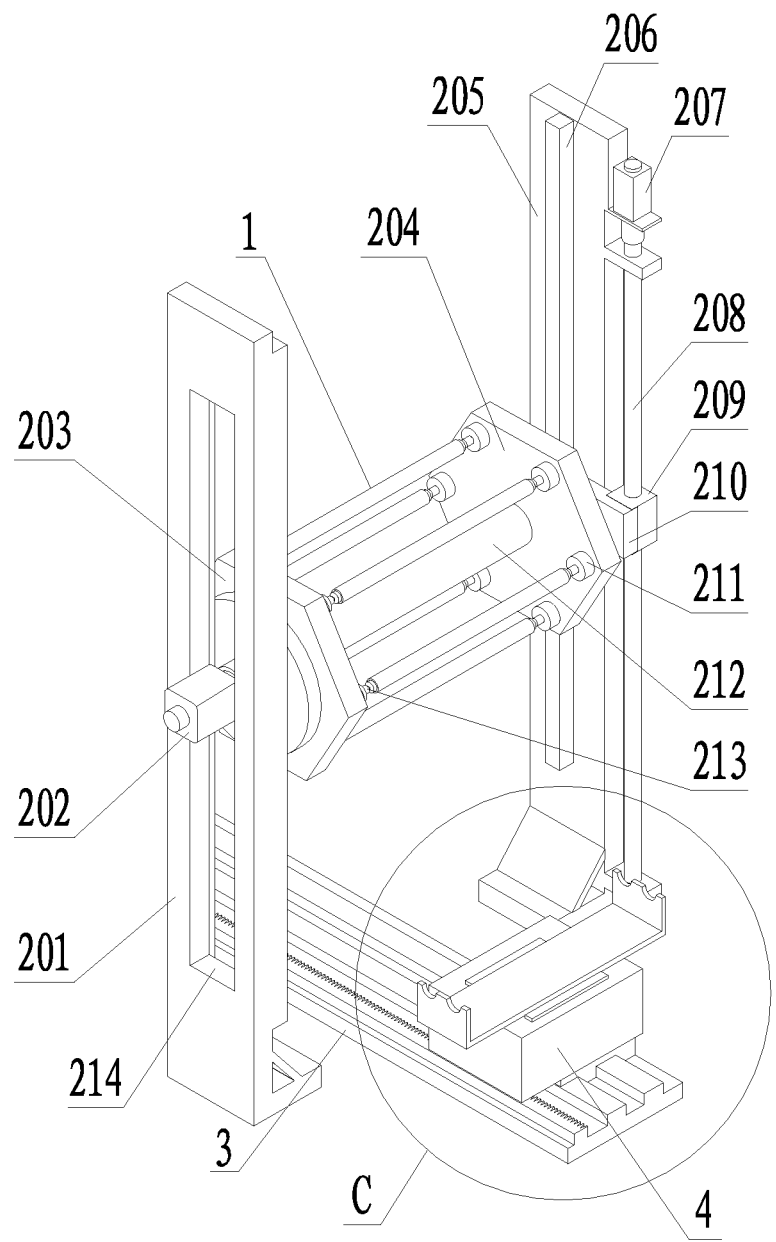
FIG. 7 is a schematic diagram illustrating a spatial structure of a part of the automatic rubbing roller storage system as illustrated in FIG. 4.

In an example of this embodiment, the roller storing device 2 includes a rotatable roller storing portion 20. As illustrated in FIG. 6 and FIG. 7, the roller storing portion 20 has one end connected to a first holder 201 and the other end connected to a second holder 205; the first holder 201 and the second holder 205 are fixedly mounted at two sides of the roller transport track 3, respectively, and the first holder 201 is provided with a first motor 202 which can drive the roller storing portion 20 to rotate; furthermore, one end of the roller storing portion 20 is provided with at least two first clampers 213 which are uniformly distributed along a circumferential direction, and the other end of the roller storing portion 20 is provided with second clampers 211 which are disposed corresponding to the first clampers 213, wherein the first damper 213 and the corresponding second clamper 211 are cooperated with each other to hold the roller 1 therebetween.

In an example of this embodiment, the roller transport platform 4 is disposed on the roller transport track 3. As illustrated in FIGS. 6-8 and FIG. 10, the roller transport platform 4 includes a sliding base 401 slidably engaged with the roller transport track 3 and a roller placement platform 402 on which the roller 1 can be placed; a transmission device and a guiding pair are disposed between the roller transport track 3 and the sliding base 401 and configured to drive the sliding base 401 to move in linear motion along the roller transport track 3; the sliding base 401 is provided with a first lifting device configured to drive the roller placement platform 402 to move upwards and downwards, and the roller placement platform 402 is provided with a roller storing slot 403.

Figure 9:
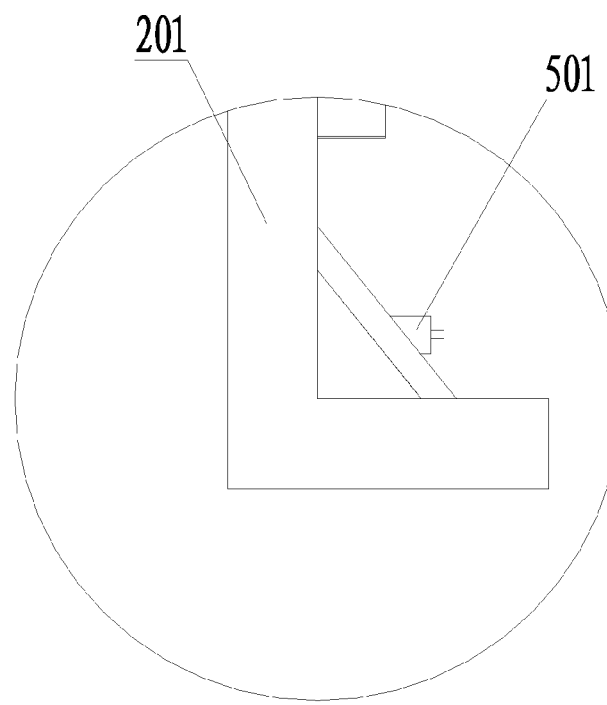
FIG. 9 is an enlarged view illustrating a structure of part B as illustrated in FIG. 6.
Figure 10:
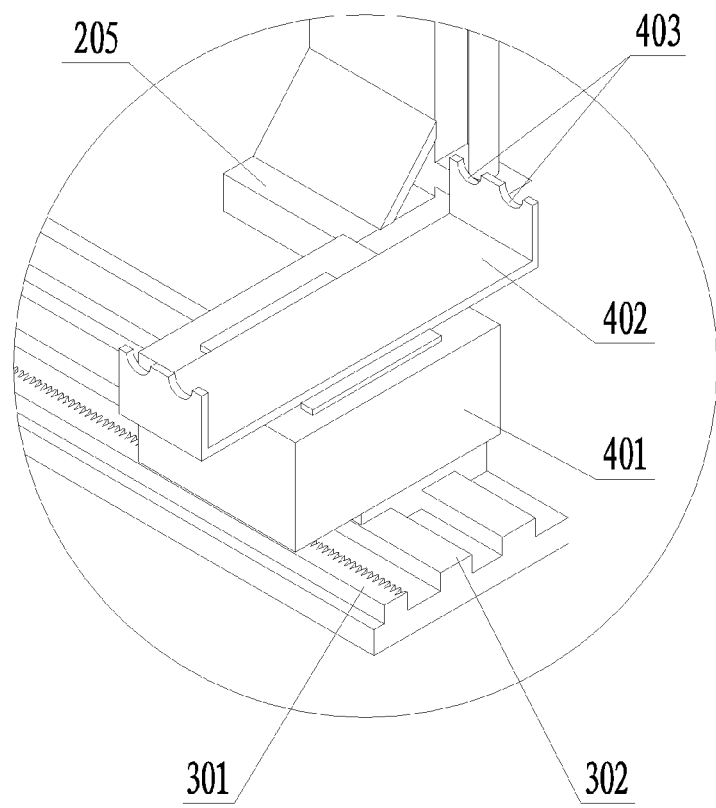
FIG. 10 is an enlarged view illustrating a structure of part C as illustrated in FIG. 7.
Figure 11:
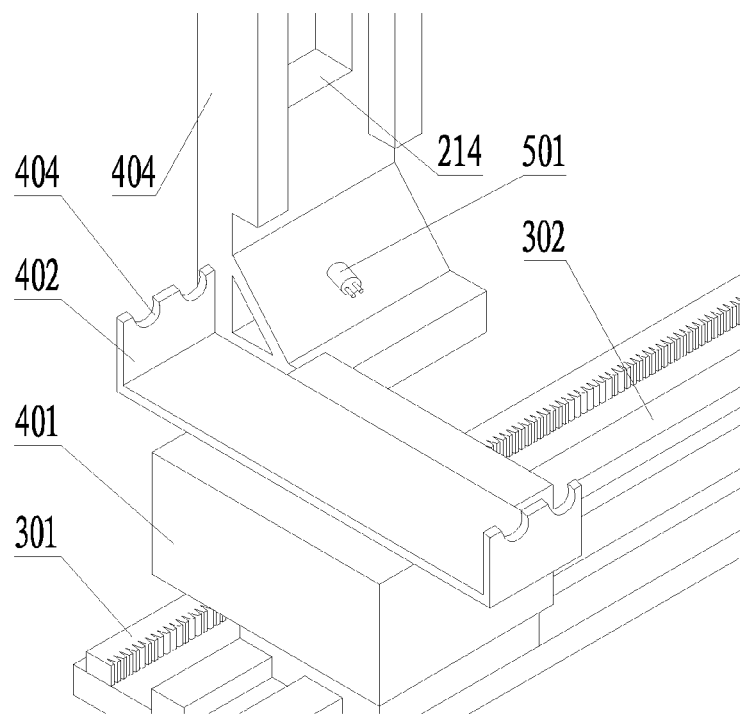
FIG. 11 is an enlarged view illustrating a spatial structure of part B as illustrated in FIG. 6.

In an example of this embodiment, the positioning device 5 includes a sensor 501 configured to sense the roller transport platform 4. As illustrated in FIG. 9 and FIG. 11, the sensor 501 is fixed on the first holder 201 (it can also be fixed on the second holder 205, of course) and is electrically connected to a control unit 8 which controls a movement condition of each of the first motor 202, the transmission device and the first lifting device and controls a clamping action of the first holder 213 and/or the second damper 211.

Figure 5:
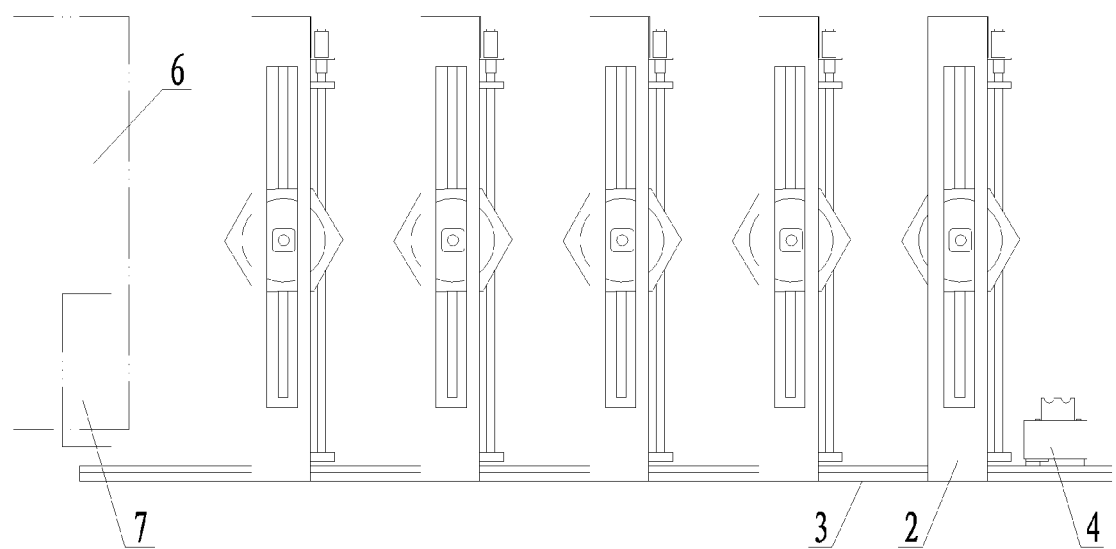
FIG. 5 is a front view of the automatic rubbing roller storage system as illustrated in FIG. 4.

In the automatic rubbing roller storage system according to the present embodiment, the roller transport track 3 has one end disposed at a roller-picking ready position near the rubbing machinery 6. As illustrated in FIG. 5, when the roller transport platform 4 that is slidably movable in reciprocating linear motion on the roller transport track 3 moves to be in front of the rubbing machinery 6, the roller placement platform 402 on the roller transport platform 4 can be raised or descended to a roller-loading position on the rubbing machinery 6; at this time, through an automatic roller-loading device 7, the rubbing machinery 6 can automatically load a corresponding roller 1 and place the roller 1 into the roller placement slot 403 on the roller placement platform 402 which has been raised or descended to the roller-loading position; subsequently, with an action of the transmission device, the roller transport platform 4 carried with the roller 1 slides to a roller-storing ready position under the roller storing device 2, and is precisely positioned there by the positioning device 5; subsequently, the first lifting device, again, drives the roller placement platform 402 to move upwards until reaching a clamping position at a certain height corresponding to the precisely positioned roller-storing ready position, so that the roller 1 having been precisely positioned can be held tightly between a pair of clampers disposed at two sides of the roller storing portion 20, that is, the first clamper 213 and the second clamper 211; subsequently, the first lifting device drives the roller placement platform 402 to move downwards to return to an original position; subsequently, the first motor 202 (as illustrated in FIG. 7) drives the roller storing portion 20 to rotate by a certain angle so as to facilitate another pair of clampers disposed at two ends of the roller storing portion 20 to tightly hold next roller 1 therebetween.

The rubbing machinery 6 itself is provided with the automatic roller-loading device 7 and hence is able to load the roller automatically; moreover, operation conditions of the first lifting device, the transmission device, the damper, the roller storing portion 20 and the positioning device are all controlled by the controller 8 through automatic control and cooperation, so that the automatic rubbing roller storage system according to embodiments of the present invention can achieve automatic pick-and-place of the roller 1 to shorten the time cost for pick-and-place operation and improve the efficiency thereof; in addition, the automatic rubbing roller storage system according to embodiments of the present invention requires neither manual pick-and-place operation of the roller 1 nor the assistance of robot operation, which saves a large number of human labors and also reduces cost for production and maintenance. Furthermore, the roller storing portion 20 itself is rotatable, which allows the roller 1 carried thereon always rotating around the roller storing portion 20, resulting in uniform force of gravity subjected by respective points on the roller so as to prevent the roller from deforming due to long-time storage, and hence to ensure certain qualities and service life of the roller during storage.

In an example of this embodiment, the roller storing portion 20 includes a first clamping plate 203 and a second clamping plate 204 which are fixedly connected together through a coupling shaft 212, wherein an inner side of the first clamping plate 203 is provided with at least two first clampers 213 uniformly distributed along a circumferential direction, and an inner side of the second clamping plate 204 is provided with second dampers 214 corresponding to the first clampers 213; the first motor 202 has an output shaft fixedly connected to the first clamping plate 203 and has an outer casing connected to the first holder 201. The first clamping plate 203 and the second clamping plate 204 both have a disc-like structure and can be made of commonly used plate materials with not only low material cost but also low production cost due to simple manufacture process thereof; fixedly connecting the first clamping plate and the corresponding second clamping plate together through the coupling shaft 212 can not only allow the two clamping plates always rotating synchronously to avoid internal stress and torque generated in the roller held between the two clamping plates so as to ensure qualities of the roller but also can obtain advantages of easy disassembling and assembling, easy manufacturing and low cost as compared with one-piece apparatus; fixedly connecting the output shaft of the first motor 202 and the first clamping plate 203 together either directly or indirectly while connecting the outer casing of the first motor 202 and the first holder 201 either directly or indirectly allow the first motor 202 driving the entire roller storing portion 20 to rotate with respective to the two holders; that is, the output shaft of the first motor 202 drives the first clamping plate 203 to rotate, and the first clamping plate 203 in turn drives the second clamping plate 204 to rotate synchronously through the coupling shaft 212, so that the two clamping plates, together, drive the roller 1 held therebetween to rotate about an axis of the coupling shaft 212.

For purpose of enhancing adaptability and adjustability of embodiments according to the present invention, in an example, the first holder 201 is provided with a first sliding chute 214 in a vertical direction; the outer casing of the first motor is provided with at least one pair of parallel guiding surfaces, the guiding surfaces are slidably engaged with the first sliding chute 214; an inner side of the second holder 205 is provided with a sliding track 206 in a vertical direction; an outer side of the second clamping plate 204 is provided with a second sliding chute (not illustrated) slidably engaged with the sliding track 206; the second holder 205 is provided with a second lifting device which can drive the second clamping plate 204 to move upwards and downwards, with a raising and descending action of the second lifting device being controlled by the control unit 8.

The slidable engagement between the above-mentioned first sliding chute 214 on the first holder 201 and the guiding surface of the outer casing of the first motor forms a first guiding pair, and the slidable engagement between the second sliding chute and the sliding track 206 on the second holder 205 forms a second guiding pair; considering the two clamping plates are in synchronous movement, when the control unit 8 sends an operation instruction to the second lifting device, the second lifting device drives the second clamping plate 204 to move upwards and downwards; at this time, the first clamping plate 203 will be in synchronous up-and-down movement, that is, the second lifting device drives the entire roller storing portion 20 to slide upwards and downwards steadily with the guidance of the guiding pairs on the two holders, so as to flexibly control an interval between the roller storing portion 20 and the roller transport track 3 (or the roller transport platform 4) according to field working requirement and to provide the automatic pick-and-place operation of roller 1 with more convenient conditions, thereby considerably enhancing the adaptability and adjustability of the entire system. Additionally, the arrangement of such structure ensures that the roller storing portion 20 still can be driven to move upwards and downwards by the second lifting device so as to achieve roller-storing step even when the first lifting device is out of work.

In an example of this embodiment, in order to avoid any sliding friction between the outer casing of the first motor 202 and the first sliding chute 214 of the first holder 201, an outer side of the first clamping plate 203 can be provided with a first sliding block (not illustrated) which is slidably engaged with the first sliding chute 214 and is fixedly connected to the outer casing of the first motor 202; that is, the outer casing of the first motor 202 is indirectly connected to the first holder 201. Similarly, as mentioned above, an inner side of the second holder 205 is provided with a sliding track 206 in a vertical direction, and an outer side of the second clamping plate 204 is provided with a second sliding chute (not illustrated) slidably engaged with the sliding track 206; the second holder 205 is provided with the second lifting device which can drive the second clamping plate 204 to move upwards and downwards, with the raising and descending action of the second lifting device being controlled by the control unit 8.

In an example of this embodiment, the above-mentioned second lifting device can include a second motor 207, a screw rod 208 fixedly connected to an output shaft of the second motor 207, and a nut 209 engaged with the screw rod 208; wherein the nut 209 is fixedly connected to the second clamping plate 204, an outer casing of the second motor 207 is fixedly mounted on the second holder 205, and a rotation of the output shaft of the second motor 207 is controlled by the control unit 8. With such arrangement, when the control unit 8 sends an operation instruction to the second motor 207, the second motor 207 drives the screw rod 208 to rotate, which in turn drives the nut 209 to move upwards and downwards in linear motion, which in turn drives the second clamping plate 204 fixedly connected to the nut 209 to move upwards and downwards in linear motion, so as to achieve up-and-down linear motion of the entire roller storing portion 20.

In an example of this embodiment, in order to reduce a sliding friction between the sliding track 206 and the second sliding chute, for example, the outer side of the second clamping plate 204 can be provided with a second sliding block 210, and the second sliding chute (not illustrated) can be provided on an outer side of the second sliding block 210; the nut 209 is fixedly connected to the second sliding block 210; and the sliding track 206 is a linear guiding track. With such arrangement, it can ensure the roller storing portion 20 moving upwards and downwards in a smooth manner.

In an example of this embodiment, in order to facilitate positioning during the pick-and-place operation of the roller 1, for example, the first clamping plate 203 and the second clamping plate 204 both can be configured as a disk-like structure in a shape of regular polygon. For example, the first clamping plate 203 and the second clamping plate 204 can have a disk-like structure in a shape of polygon having even number of edges such as square, regular hexagon, regular octagon, regular decagon and regular dodecagon. With such arrangement, the entire roller storing portion 20 is kept balanced during the pick-and-place operation for pairs of rollers 1. Of course, the first clamping plate 203 and the second clamping plate 204 can also be configured as a structure in a shape of polygon having odd number of edges. For another example, the first clamper 213 can be fixedly connected at a corner position of the first clamping plate 203; correspondingly, the second clamper 211 can be fixedly connected at a corner position of the second clamping plate 204; arranging the dampers at corners of corresponding clamping plates allows performing the positioning in a considerably more convenient and stable manner.

In an example of this embodiment, the first clamper 213 can be configured as a pneumatic claw, and the second clamper 211 can be configured as a claw groove, with a clamping action of the pneumatic claw being controlled by the control unit 8. In this example, for example, when placing the roller 1, the control unit 8 controls the pneumatic claw to open its fingers so as to allow a first end of the roller 1 being placed at its center while a second end of the roller 1 being aligned with the claw groove; then the control unit 8 controls the pneumatic claw to close its fingers so as to tightly grip the first end of the roller 1 and push the second end of the roller 1 into the claw groove; in this way, the roller 1 is stably held between the first clamping plate 203 and the second clamping plate 204. Such an example in which one of two clampers cooperated with each other is configured as a pneumatic claw while the other one is configured as a claw groove is advantageous in its simple structure with pneumatic executive components thereof being environmentally-friendly during operation.

Figure 8:
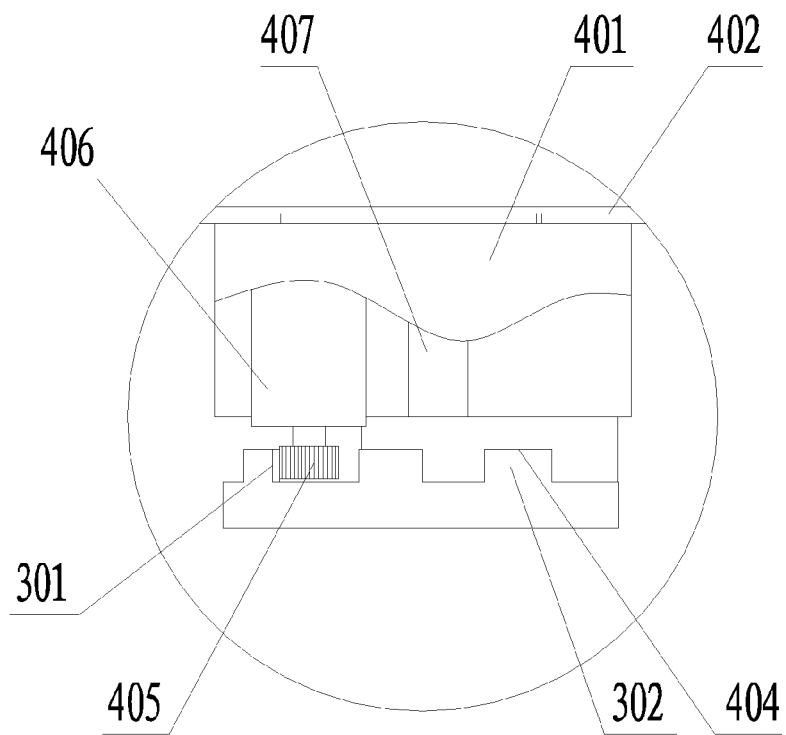
FIG. 8 is an enlarged view illustrating a structure of part A as illustrated in FIG. 6.

In an example of this embodiment, in order to provide a sliding motion of the roller transport platform 4 on the roller transport track 3 in a smoother manner, as illustrated in FIG. 8, a rack 301, a gear 405 engaged with the rack 301 and a roller transport motor 406 that rotates the gear 405 are disposed along a length direction of the roller transport track 3; wherein, an outer casing of the roller transport motor is fixedly connected at the sliding base 401, an output shaft of the roller transport motor 406 is fixedly connected to the gear 405, and the roller transport motor 406 is electrically connected to the control unit 8; in this way, an entire transmission device is constituted. Furthermore, the roller transport track 3 is provided with a guiding track 302 along a length direction thereof; the sliding base 401 is provided with a guiding groove 404 slidably engaged with guiding track 302; and a slidable engagement between the guiding track 302 and the guiding groove 404 forms a guiding pair. The roller transport motor 406 on the sliding base 401 will drive the gear 405 to rotate so as to drive the entire roller transport platform 4 to move in reciprocating linear motion on the roller transport track 3. Of course, apart from those described in this embodiment, other transmission devices capable of achieving linear transmission can also be used herein, for example, belt-wheel transmission device, chain transmission device and the like. Besides, instead of the guiding pair using slidable engagement constituted by the above-mentioned guiding track and guiding groove, it is also possible to dispose a guiding groove on the roller transport track 3 and dispose a guiding block slidably engaged with the guiding groove on the sliding base 401.

For simplifying the structure and facilitating the implementation of control, in an example of this embodiment, the first lifting device is configured as a cylinder 407, as illustrated in FIG. 8, a base of the cylinder is fixedly connected to the sliding base 401, and a piston rod of the cylinder is fixedly connected to the roller placement platform 402, with an up-and-down movement of the piston rod of the cylinder for stretching out and drawing back being controlled by the control unit 8. When it is required to load the roller 1 from the rubbing machinery 6 for storing, the control unit 8 controls the cylinder 407 at a standby state under the automatic roller-loading device 7 to stretch out the piston rod so as to push the roller placement platform 402 to move upwards until reaching a roller-receiving position; when the automatic roller-loading device 7 places the roller 1 into the roller placement slot 403 on the roller placement platform 402, the control unit 8 controls the piston rod to draw back so as to drive the roller placement platform 402 to move downwards to return to an original position; when the roller placement platform 402 returns to the original position, the control unit 8 controls the roller transport motor 406 on the sliding base 401 to drive the entire roller transport platform 4 to move in linear motion on the roller transport track 3 until reaching a corresponding position under the roller storing device 2 and then store the roller 1 at a corresponding position on the roller storing portion 20.

During the pick-and-place operation of the roller, for purpose of always keeping a force subjected by the roller storing portion 20 balanced, it is possible to perform the pick-and-place operation in terms of a pair of rollers 1 one time. Of course, the positions for storing pairs of rollers 1 on the roller storing portion 20 can be in symmetry with respective to the axis of the roller storing portion 20, so the roller placement slots 403 can be arranged in two rows parallel to each other, or in a single row or more than two rows.

Second Embodiment

The present embodiment provides an automatic rubbing roller pick-and-place method by using the automatic rubbing roller storage system described in the first embodiment, including a roller-picking step, a roller-transporting step and a roller-storing step which are performed in sequence.

In an example, the roller-picking step includes: the control unit 8 controls the transmission device (for example, the roller transport motor 406) between the roller transport platform 4 and the roller transport track 3 to drive the roller transport platform 4 to move along the roller transport track 3 until reaching a roller-picking ready position near the rubbing machinery 6 carried with the roller 1 to be picked; then the control unit 8 controls the first lifting device (for example, the above-mentioned cylinder 407) to drive the roller placement platform 402 to move upwards until reaching a receiving position at a certain height; then the automatic roller-loading device 7 of the rubbing machinery 6 automatically loads the roller 1 into the roller placement slot 403 on the roller placement platform 402; then the control unit 8 controls the first lifting device (cylinder 407) to drive the roller placement platform 402 to move downwards to return to an original position; when the roller placement platform 402 returns to the original position, the roller-picking step is completed; the "roller-picking step" as used herein refers to picking up the roller 1 from the rubbing machinery 6 and then placing the roller 1 onto the roller transport platform 4.

In an example, the roller-transporting step includes: the control unit 8, again, controls the transmission device (for example, the roller transport motor 406) to drive the roller transport platform 4 carried with the roller 1 to move towards the roller storing device 2; when the roller transport platform 4 arrives at a roller-storing ready position of the roller storing device 2, the control unit 8 controls the positioning device 5 (for example, the sensor 501) to precisely position the roller transport platform 4; when the roller transport platform 4 is positioned, the roller-transporting step is completed.

In an example, the roller-storing step includes: the control unit 8 controls the first motor 202 to drive the roller storing portion 20 on the roller storing device 2 to rotate by a certain angle, so as to allow a corresponding storing position on the roller storing portion 20 being right above the roller 1 on the roller transport platform 4 which has been precisely positioned; then the control unit 8 controls the second motor 207 to drive the roller storing portion 20 to move downwards until reaching an appropriate position (and/or, the control unit 8 controls the first lifting device to push the roller placement platform 402 on the roller transport platform 4 to move upwards until reaching the appropriate position), that is, reaching a clamping position corresponding to the roller-storing ready position; then the control unit 8 controls the first clamper 213 (the pneumatic claw) and the second clamper 211 to hold the roller 1 therebetween; then the control unit 8 controls the second motor 207 to drive the roller storing portion 20 to move upwards to return to the original position (and/or, the control unit 8 controls the first lifting device to drive the roller placement platform 402 to move downwards to return to the original position) so as to completing the roller-storing step. Alternatively, during this step, the control unit 8 can also control the second motor 207 to drive the roller storing portion 20 to move downwards at first, and then controls the first motor 202 to drive the roller storing portion 20 to rotate.

In this embodiment, another roller-picking step of picking up the roller 1 from the roller storing portion 20 and placing the roller 1 onto the roller transport platform 4 is exactly opposite to the above-mentioned roller-storing step, that is, including: the control unit 8 controls the second motor 207 to drive the roller transport portion 20 to move downwards until reaching the corresponding position, then controls the first motor 202 to drive the roller storing portion 20 to rotate so as to allow the roller 1 exactly facing the roller placement slot 403, then controls the first damper 213 to release the roller 1 to be falling into the roller placement slot 403, and then controls the second motor 207 to drive the roller storing portion 20 to move upwards to return to its original position so as to complete another roller-picking step. Alternatively, during this process, the control unit 8 controls the first motor 202 to drive the roller storing portion 20 to rotate at first and then controls the second motor 207 to drive the roller storing portion 20 to move downwards to return to its original position, with details thereof being omitted herein.

Figure 12:
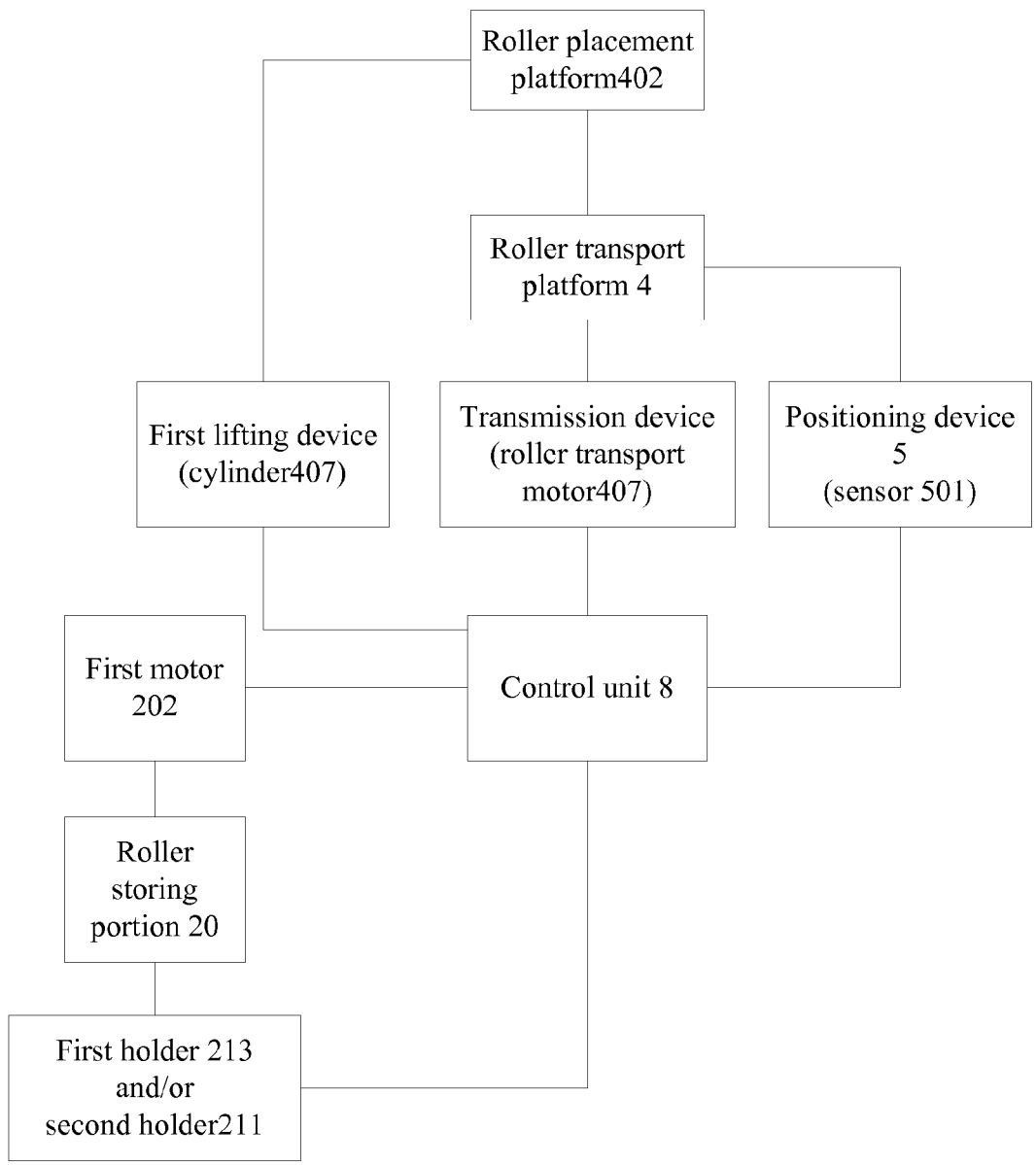
FIG. 12 is a schematic view illustrating a working flow of a control unit in an automatic rubbing roller storage system according to an embodiment of the present invention.

FIG. 12 is a schematic diagram illustrating a working flow of the control unit 8 in an example of the automatic rubbing roller pick-and-place method as provided by embodiments of the present invention. For the working principle of the control unit 8, reference can be made to the corresponding description in connection with the above-mentioned first and second embodiment without details being repeated herein. It should be explained that, although FIG. 12 merely illustrates connections between the control unit 8 and the first motor 202, the transmission device, the first lifting device and the positioning device 5, those skilled in the art will understand that the control unit 8 can also be connected to the second lifting device (for example, the second motor 207) not illustrated in FIG. 12 according to the description in connection with the first and second embodiment, without details being repeated herein.

Particular features, structures, materials or characteristics described in the present description can be combined in any appropriate manner in any other one or more embodiments.

It is understood that the described above are just exemplary implementations and embodiments to explain the principle of the present invention and the invention is not intended to be limited thereto. An ordinary person in the art can make various variations and modifications to the present invention without departure from the spirit and the scope of the present invention, and such variations and modifications shall fall in the scope of the present invention.

The present application claims the priority of China patent application No. 201410765876.5 filed on Dec. 12, 2014 titled "AUTOMATIC RUBBING ROLLER STORAGE SYSTEM AND PICK-AND-PLACE METHOD", which is incorporated herein by reference in its entirely.

What is claimed is:

1. An automatic rubbing roller storage system, comprising a roller storing device, a roller transport track, a roller transport platform and a positioning device, wherein, the roller storing device comprises a rotatable roller storing portion, the roller storing portion has one end connected to a first holder and the other end connected to a second holder; the first holder and the second holder are fixedly mounted at two sides of the roller transport track; the first holder is provided with a first motor configured to drive the roller storing portion to rotate; one end of the roller storing portion is provided with at least two first dampers uniformly distributed along a circumferential direction, and the other end of the roller storing portion is provided with second dampers corresponding to the first dampers; and the first damper and the corresponding second damper are cooperated with each other to hold a roller therebetween;

the roller transport platform is disposed on the roller transport track, and comprises a sliding base slidably engaged with the roller transport track and a roller placement platform for placing the roller; a transmission device and a guiding pair are disposed between the roller transport track and the sliding base so as to drive the sliding base to move in linear motion along the roller transport track; the sliding base is provided with a first lifting device configured to drive the roller placement platform to move upwards and downwards; and the roller placement platform is provided with a roller placement slot;

the positioning device comprises a sensor configured to sense the roller transport platform, and the sensor is fixed on at least one of the first holder and the second holder and is electrically connected to a control unit; and a movement condition of each of the first motor, the transmission device and the first lifting device is controlled by the control unit, and a clamping action of at least one of the first damper and the second damper is controlled by the control unit.

2. The automatic rubbing roller storage system of claim 1, wherein the first damper is a pneumatic claw, the second damper is a claw groove, and a clamping action of the pneumatic claw is controlled by the control unit.

3. The automatic rubbing roller storage system of claim 1, wherein the transmission device comprises a rack disposed along a length direction of the roller transport track, a gear engaged with the rack, and a roller transport motor configured to drive the gear to rotate; an outer casing of the roller transport motor is fixedly connected at the sliding base, an output shaft of the roller transport motor is fixedly connected to the gear, and the roller transport motor is electrically connected to the control unit.

4. The automatic rubbing roller storage system of claim 1, wherein the first lifting device is a cylinder, a base of the cylinder is fixedly connected to the sliding base, a piston rod of the cylinder is fixedly connected to the roller placement platform, and an up-and-down action for stretching out and drawing back of the piston rod of the cylinder is controlled by the control unit.

5. The automatic rubbing roller storage system of claim 1, wherein the roller transport track is provided with a guiding track along a length direction thereof, the sliding base is provided with a guiding groove slidably engaged with the guiding track, and a slidable engagement between the guiding track and the guiding groove forms the guiding pair.

6. The autor automatic rubbing roller storage system of claim 1, wherein the roller placement slot is arranged in two rows in parallel.

7. An automatic rubbing roller pick-and-place method by using the automatic rubbing roller storage system of claim 1, comprising a roller-picking step, a roller-transporting step and a roller-storing step which are performed in sequence, wherein, the roller-picking step comprises: the control unit controls the transmission device between the roller transport platform and the roller transport track to drive the roller transport platform to move along the roller transport track until reaching a roller-picking ready position of a rubbing machinery carried with a roller to be picked; then the control unit controls the first lifting device to drive the roller placement platform to move upwards until reaching a receiving position at a certain height; then an automatic roller-loading device of the rubbing machinery automatically loads the roller to be picked into the roller placement slot on the roller placement platform; then the control unit controls the first lifting device to drive the roller placement platform to move downwards to return to an original position;

the roller-transporting step comprises: the control unit controls the transmission device to drive the roller transport platform carried with the roller to move until reaching a roller-storing ready position of the roller storing device, then controls the positioning device to precisely position the roller transport platform;

the roller-storing step comprises: the control unit controls the first motor to drive the roller storing portion to rotate by a certain angle, so as to allow a corresponding storing position on the roller storing portion being right above the roller on the roller transport platform which has been precisely positioned; then the control unit controls the first lifting device to drive the roller placement platform upwards until reaching a clamping position, and/or, controls the second motor to drive the roller storing portion to move downwards until reaching the clamping position; then the control unit controls the first damper and the second damper to hold the roller therebetween; then the control unit controls the first lifting device to drive the roller placement platform to move downwards to return to its original position, and/or, controls the second motor to drive the roller storing portion to move upwards to return to its original position.

8. An automatic rubbing roller pick-and-place method by using the automatic rubbing roller storage system of claim 1, comprising a roller-picking step, a roller-transporting step and a roller-storing step which are performed in sequence, wherein, the roller-picking step comprises: the control unit controls the transmission device between the roller transport platform and the roller transport track to drive the roller transport platform to move along the roller transport track until reaching a roller-picking ready position of a rubbing machinery carried with a roller to be picked; then the control unit controls the first lifting device to drive the roller placement platform to move upwards until reaching a receiving position at a certain height; then an automatic roller-loading device of the rubbing machinery automatically loads the roller to be picked into the roller placement slot on the roller placement platform; then the control unit controls the first lifting device to drive the roller placement platform to move downwards to return to an original position;

the roller-transporting step comprises: the control unit controls the transmission device to drive the roller transport platform carried with the roller to move until reaching a roller-storing ready position of the roller storing device, then controls the positioning device to precisely position the roller transport platform;

the roller-storing step comprises: the control unit controls the first lifting device to drive the roller placement platform to move upwards until reaching a clamping position, and/or, controls the second motor to drive the roller storing portion to move downwards until reaching the clamping position; then the control unit controls the first motor to drive the roller storing portion to rotate by a certain angle so as to allow a corresponding storing position on the roller storing portion being right above the roller on the roller transport platform which has been precisely positioned; then the control unit controls the first clamper and the second damper to hold the roller therebetween; then the control unit controls the first lifting device to drive the roller placement platform to move downwards to return to its original position, and/or, controls the second motor to drive the roller storing portion to move upwards to return to its original position.

9. The automatic rubbing roller storage system of claim 1, wherein the roller storing portion comprises a first clamping plate and a second clamping plate which are fixedly connected together through a coupling shaft; an inner side of the first clamping plate is provided with the at least two first dampers uniformly distributed along a circumference direction, and an inner side of the second clamping plate is provided with the second dampers corresponding to the first dampers; an output shaft of the first motor is fixedly connected to the first clamping plate, and an outer casing of the first motor is connected to the first holder.

10. The automatic rubbing roller storage system of claim 9, wherein the first holder is provided with a first sliding chute along a vertical direction; the outer casing of the first motor is provided with at least one pair of guiding surfaces parallel to each other, the guiding surfaces are slidably engaged with the first sliding chute; an inner side of the second holder is provided with a sliding track along a vertical direction; an outer side of the second clamping plate is provided with a second sliding chute slidably engaged with the sliding track; the second holder is provided with a second lifting device configured to drive the second clamping plate to move upwards and downwards, and a raising and descending action of the second lifting device is controlled by the control unit.

11. The automatic rubbing roller storage system of claim 10, wherein the sliding track is a linear guiding track.

12. The automatic rubbing roller storage system of claim 10, wherein the second lifting device comprises a second motor, a screw rod fixedly connected to an output shaft of the second motor, and a nut engaged with the screw rod; the nut is fixedly connected to the second clamping plate; an outer casing of the second motor is fixedly mounted on the second holder: and the second motor is electrically connected to the control unit.

13. The automatic rubbing roller storage system of claim 12, wherein the outer side of the second clamping plate is provided with a second sliding block, the second sliding chute is provided at an outer side of the second sliding block; and the nut is fixedly connected to the second sliding block.

14. The automatic rubbing roller storage system of claim 9, wherein the first holder is provided with a first sliding chute along a vertical direction; an outer side of the first clamping plate is provided with a first sliding block slidably engaged with the first sliding chute; the outer casing of the first motor is fixedly connected to the first sliding block; an inner side of the second holder is provided with a sliding track along a vertical direction, an outer side of the second clamping plate is provided with a second sliding chute slidably engaged with the sliding track; the second holder is provided with a second lifting device configured to drive the second clamping plate to move upwards and downwards, and a raising and descending action of the second lifting device is controlled by the control unit.

15. The automatic rubbing roller storage system of claim 14, wherein the second lifting device comprises a second motor, a screw rod fixedly connected to an output shaft of the second motor, and a nut engaged with the screw rod; the nut is fixedly connected to the second clamping plate; an outer casing of the second motor is fixedly mounted on the second holder; and the second motor is electrically connected to the control unit.

16. The automatic rubbing roller storage system of claim 14, wherein the sliding track is a linear guiding track.

17. The automatic rubbing roller storage system of claim 9, wherein the first clamping plate and the second clamping plate both have a disc-like structure in a shape of regular polygon; the first damper is fixedly connected at a corner position of the first clamping plate, and correspondingly the second damper is fixedly connected at a corner position of the second clamping plate.

18. The automatic rubbing roller storage system of claim 17, wherein the first clamping plate and the second clamping plate both have a disc-like structure in a shape of square, regular hexagon, regular octagon, regular decagon or regular dodecagon.

* * * * *